Patented Aug. 15, 1939

2,169,434

UNITED STATES PATENT OFFICE 2,169,434

PROCESS OR DEQUATERNATING QUATERNARY AMMONIUM DYESTUFFS

George Schwarz, Antwerp, Belgium, assignor to Gevaert Photo-Producten N. V., Antwerp, Belgium No Drawing. Application May 29, 1936, Serial No. 82,625. In Austria June 6, 1935

5 Claims. (Cl. 260—240)

My invention relates to organic compounds having characteristics of dyestuffs capable of sensitizing photographic emulsions and possessing properties which render them suitable for use as indicators. It more particularly relates to heterocyclic polymethine compounds and to the process of making same.

The new compounds are assumed to contain at least two rings or ring systems in the molecule, each of which contains a nitrogen atom.

There are dyestuffs known which consist of quaternary cyclammonium bases or which contain such bases or derive from them. As is well known, these bases contain at least one quaternary nitrogen atom which is linked to cyclic carbon atoms of a nucleus with three valences, as a rule with a double bond. On the other hand it has added the two components of an ester.

I have now found that it is possible to convert dyestuffs of the kind hereinbefore mentioned into a new kind of compounds by "dequaternation", i. e. by converting them, as far as the quaternary nitrogen atom is concerned, into tertiary amines, wherein the ester originally added to this nitrogen atom is split off.

The new tertiary amines thus formed are colorless or slightly colored, for instance slightly yellow colored bases which are capable of forming salt-like compounds by adding acids to the nitrogen. I have found surprisingly that the salt-like compounds thus formed possess about the same light absorption capacity, i. e. about the same color as the quaternary dyestuff which corresponds to the tertiary amine base. The addition of acid occurs if the tertiary amine is acted upon with an acid. If the salt-like compound formed in the reaction is treated with alkali, the amine base is restored. The formation of the colorless or slightly yellow colored amine base may also take place already in the case of strong dilution, i. e. by an hydrolytic process, without alkali being added.

In alcoholic solution the new compounds formed by dequaternation are yellow colored. The starting compounds possess different colors and may even be red or blue. After the addition of acid the maximum of light absorption is again substantially identical with that of the original quaternary ammonium base.

Dequaternation causes a reduction of the melting point of the compounds by about 100° C. Some of the dequaternated derivatives, which are not converted into salt-like compounds, are more readily soluble in organic solvents, for instance in alcohol, than the corresponding quaternary ammonium bases.

It is assumed that the quaternary ammonium bases contain at least one pentavalent nitrogen atom, which is linked with three valences in a carbon ring. By dequaternation, i. e. by transforming the base into the tertiary amine, the nitrogen atom is assumed to become trivalent, but it is impossible to say, in connection with a compound containing for instance two heterocyclic nitrogen rings in the molecule, which of the two nitrogen atoms is pentavalent and which is trivalent, provided that one assumes oscillating double bonds to exist in the molecule. By the formation of the salt-like body, which takes place by the addition of an acid, the trivalent nitrogen atom becomes pentavalent again.

In view of their properties the new compounds are suitable for use as indicators and as sensitizers, for instance for photographic emulsions. The range of sensitization of the compounds corresponds, similarly as that of other compounds, on principle to the range of absorption. The maximum of sensitation is also shifted, relative to that of the absorption, by about 300 Angström towards longer waves.

The new compounds can be produced under the form of the tertiary amines by heating the quaternary heterocyclic ammonium base in basic solvents, preferably of high boiling point, and, if desired, under high pressure.

Quinaldine, aniline, monoethylaniline etc. may serve as high-boiling basic solvents.

I may start from dyestuffs of any description which are heterocyclic polymethine ammonium bases. It is immaterial from which ring system the dyestuff is derived, which ester is added to nitrogen and how many methine groups are contained in the polymethine chain.

The new tertiary amines also include cyanines, isocyanines and pseudo-cyanines, which if acted upon with acids, form salt-like compounds, the color of which differs only little or not at all from the color of the corresponding quaternary ammonium bases, while the tertiary amines are colorless or only slightly, for instance slightly yellow colored.

Example 1

1 gram thiazol purple having the formula

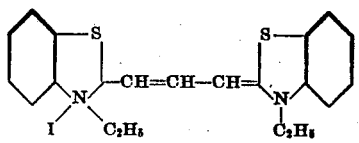

is heated one hour in 100 ccm. diethylaniline.

The violet color of the solution changes over to yellow. The diethylaniline is now driven over with steam and the residue is recrystallized in methyl alcohol. There is formed a dyestuff having the formula

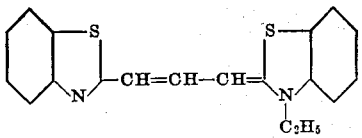

which is distinguished from the thiazol purple by the missing ethyl iodide. This new compound is yellow colored; on addition of some alcoholic hydrochloric acid the original color of the thiazol purple is restored, the acid being added to the nitrogen.

The thiazol purple used as starting material has an absorption maximum at about 5600 Angström and a sensitization maximum at about 6000 Angström. The slightly yellow colored tertiary amine absorbs only the short wave end of the visible spectrum without having a distinct maximum. The reddish violet dyestuff formed from the amine by the addition of acid, surprisingly has again an absorption maximum at about 5600 Angström and a sensitization maximum at about 6000 Angström. It differs however distinctly from the thiazol purple by the circumstance that these coloring properties are dependent to a high degree from the hydrogen ion concentration. Consequently this compound is suitable for use as an indicator and very conveniently also as a sensitizer of photographic emulsions. For if an emulsion sensitized with the new dyestuff is placed in an alkaline bath for development, the conversion of color will take place at once and the sensitization effect then extends at a maximum only from blue up to about 5400 Angström as the long wave limit. The sensitizer thus does not prevent the further developing and treatment of the exposed emulsion to be carried through under the red rays of the dark room lamp.

Example 2

One gram para-dimethylamino-styryl-2-pyridine methyl iodide, a compound of intensely orange color, which has the formula

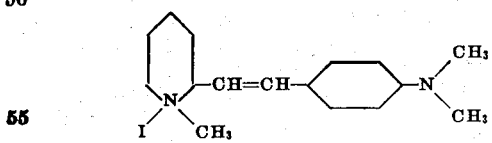

is heated one hour in diethylaniline. There is formed a slightly yellow colored compound having the formula

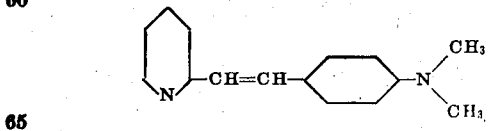

which when acted upon by a dilute acid, recovers the intensive orange color of the starting compound.

Example 3

If proceeding as described with reference to Example 1, however replacing the diethylaniline by dimethylaniline and boiling two hours, the same compounds as described with reference to Example 1 are formed.

Example 4

One gram pinacyanol, a blue-violet dyestuff having the formula

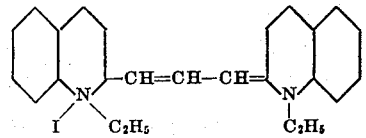

is boiled in a mixture of 50 ccm. quinoline and 50 ccm. diethylaniline. There is formed a dyestuff having the formula

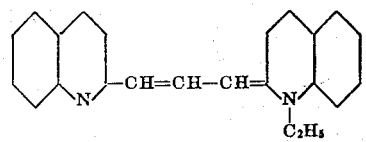

which is yellow colored. On addition of some acid the blue-violet color of the starting product appears again.

Example 5

One gram beta-naphthothiazol-carbocyanine-ethyl-iodide having the formula

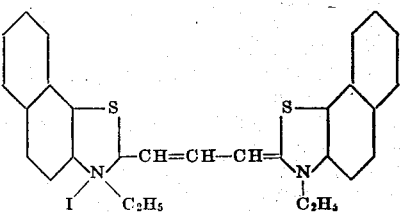

is heated two hours together with a mixture of 10 ccm. diethylaniline and 90 ccm. pyridine in a sealed tube to 200° C. After cooling the solvent is evaporated in vacuo as far as possible. The residue is a yellow dyestuff having also the character of an indicator.

Example 6

Isocyanine having the formula

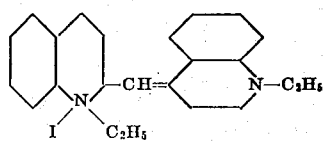

is boiled one hour under atmospheric pressure in about the tenfold quantity by weight of diethylaniline. The diethylaniline is now distilled off with steam and the residue is dissolved in some dilute HCl. On the addition of sodium acetate a yellow dyestuff is precipitated which is believed to have the formula

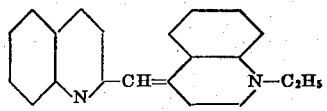

This dyestuff again recovers the red color of the quaternary compound, when treated with acid and reassumes the yellow color, when treated with an alkali.

Example 7

Thiocyanine having the formula

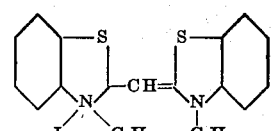

is boiled one hour in about the 100-fold quantity by weight of diethylaniline. After distilling off the diethylaniline with steam the dyestuff is filtered off and dissolved in some ethyl alcohol. In the solution the hydroiodide of the dyestuff is precipitated by adding the calculated quantity of hydrogen iodide. The constitution of this dequaternated thiocyanine after it has been converted into a salt-like compound, is assumed to be shown by the formula

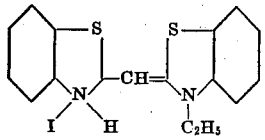

while on the addition of alkali is formed the compound

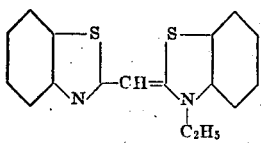

*Example 8*

10 grams of a dyestuff having the formula

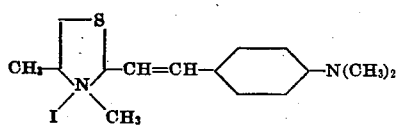

are dissolved in 100 ccm. N-ethylmethylaniline and the solution is boiled one hour. The N-ethylmethylaniline is distilled off with steam, the residue is dissolved in about 20 ccm. ethyl alcohol, to which has been added 1 ccm. concentrated hydrochloric acid and the solution is precipitated with a saturated solution of sodium acetate. The almost colorless base thus precipitated has the formula

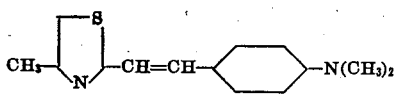

By adding acid it forms a dyestuff having about the same color as the starting dyestuff.

In an analogous manner any other dyestuffs containing a quaternary nitrogen atom may be subjected to dequaternation. It is altogether immaterial from what kind of ring system the dyestuff is derived and with what ester the quaternary compound was formed and how many methine groups are contained in the polymethine chain.

All dequaternated polymethine dyestuffs including the cyanines, isocyanines and pseudo-cyanines, if acted upon with an acid, form salt-like compounds, the color of which differs only little from that of the original dyestuffs and which possess the remarkable property of being converted by the addition of alkali or by strong dilution into colorless or slightly yellow colored bases.

The correctness of the structural formulae used in this specification and in the annexed claims depends on the correctness of the assumptions nowadays adopted by the experts in the field of cyanine and related dyestuffs. Therefore although these formulae may be subject to corrections or changes in correspondence with the scientific development of chemistry, they clearly designate to the expert, who knows the present state of this art, the nature of the substances thus defined.

Various changes may be made in the details disclosed in the foregoing specification without departing from the invention or sacrificing the advantages thereof.

I claim:

1. The process of converting a heterocyclic polymethine dyestuff selected from the group consisting of the cyanine and styryl alkyl quaternary salts into a ternary amine compound which comprises heating the starting material in a high boiling tertiary organic nitrogen base so intensely as to split off the ester from the quaternary nitrogen atom.

2. The process of converting a heterocyclic polymethine dyestuff selected from the group consisting of the cyanine and styryl alkyl quaternary salts into a ternary amine compound which comprises heating the starting material under increased pressure in a high boiling tertiary organic nitrogen base so intensely as to split off the ester from the quaternary nitrogen atom.

3. The process of claim 1, in which thiazol purple having the formula

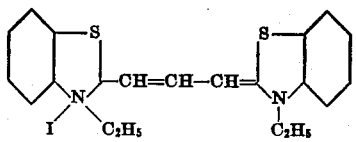

is heated with diethylaniline and in which is formed the compound having the formula

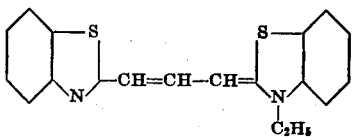

4. The process of claim 1, in which para-dimethylamino-styryl-2-pyridine methyl iodide having the formula

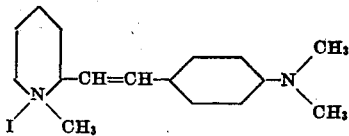

is heated with dimethylaniline, the product of reaction having the formula

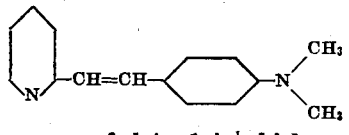

5. The process of claim 1, in which a compound having the formula

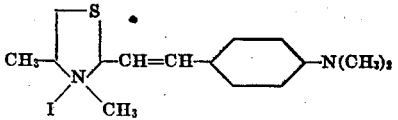

is heated with N-ethylmethylaniline, the final product being a compound having the formula

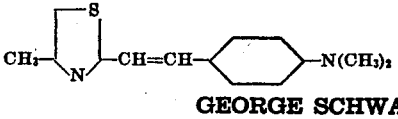

GEORGE SCHWARZ.